March 9, 1943. C. C. OTTOSON 2,313,259
FLIGHT ATTACHMENT
Filed Jan. 17, 1942

INVENTOR
CARL C. OTTOSON
BY George H. Mitchell
ATTORNEY

Patented Mar. 9, 1943

2,313,259

UNITED STATES PATENT OFFICE 2,313,259

FLIGHT ATTACHMENT

Carl C. Ottoson, West Brighton, Staten Island, N. Y.

Application January 17, 1942, Serial No. 427,107

6 Claims. (Cl. 198—175)

My invention relates to a flight attachment and the invention may be said to be in the nature of an improvement on the device set forth in Kurtz and Ottoson application, Serial No. 408,582, filed August 28, 1941.

In the aforesaid application, a conveyor with flexibly mounted flights is disclosed as embodied in a self-loading refuse truck. The flights are flexibly or resiliently mounted on the conveyor side chains and the flight mountings are so arranged as to adequately protect the bearing parts, springs, etc., from mechanical injury or contamination by refuse and other foreign matter.

In the preferred form of the invention as disclosed in said Kurtz and Ottoson application, a coil torsion spring is employed for urging a flight in one direction relatively to the side chains. The purpose and construction of the flight mounting in said application is such that when an obstruction is encountered during the loading of the refuse truck the flight may yield resiliently so as to avoid injury to any parts of the apparatus. Now it happens occasionally that the entire conveyor system must be reversed and if when the conveyor operates in a reverse direction one of the flight is in raised position against the action of its torsion spring, the spring may be stressed beyond its elastic limit so that even if it is not broken it attains a permanent set so that the flight will not always return to its proper position.

It is the general object of my invention to provide improved means for preventing overstraining or breaking of a spring in a flight mounting.

It is another object to provide improved means for limiting rotative movement between relatively rotatable parts of a flight mounting.

In the drawing which shows, for illustrative purposes only, a preferred form of the invention—

Figure 1:
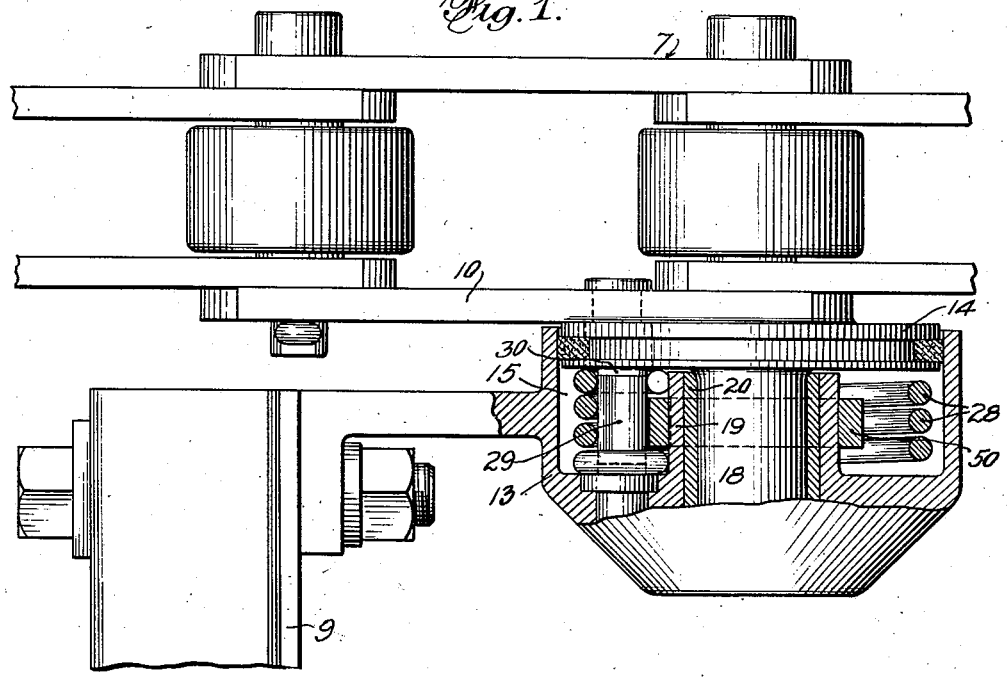
Fig. 1 is a fragmentary view of a conveyor chain with part of a flight and a flight mounting carried thereby, parts of the latter being broken away along a substantially central plane.
Figure 2:
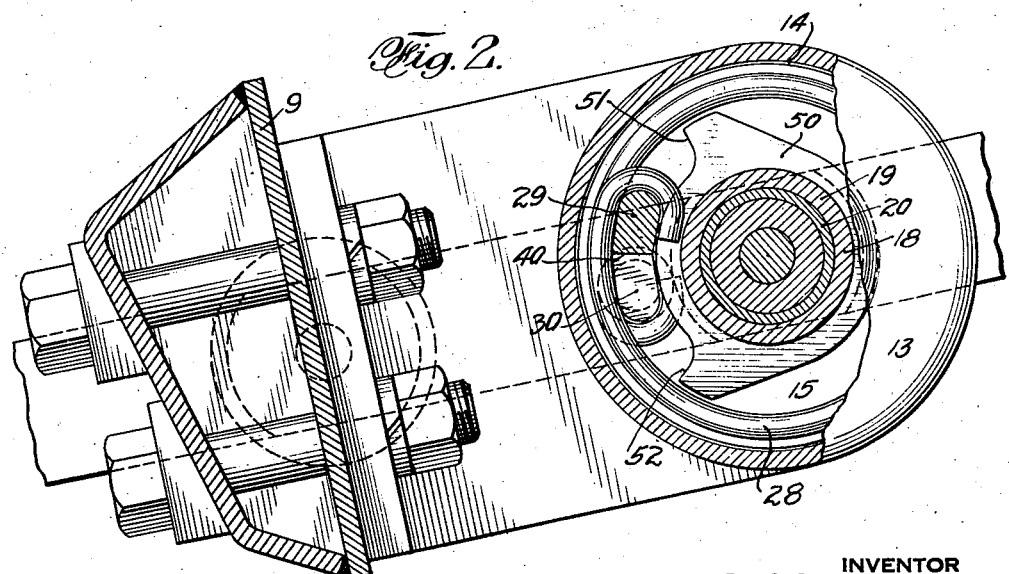
Fig. 2 is a generally sectional view taken at right angles to Fig. 1, a part of the flight mounting being shown in elevation.

The particular construction of the chains, flights, and flight mounting illustrated in this application have been fully described in the aforesaid Kurtz and Ottoson application and need be only briefly referred to here.

The conveyor chain 7, including side links 10, carries at intervals, on links such as 10, one part of a flight mounting such as the disk 14. The flight 9 has an arm with an enlarged head provided with a recess or cup 15 interfitting with the disk 14 so as to form an enclosed space. The cup and disk have interengaging bosses forming a bearing for rotatably supporting the flight on the conveyor. In the form shown, the disk embodies a boss 18, while the cup has a concentrically bored boss 19 extending over the boss 18. A wear bushing 20 may be interposed between the two bearing bosses.

The cup member carries an axially extending abutment 29, while the disk member carries a corresponding abutment 30. The coil torsion spring 28 has hook ends engageable about the abutments 29—30, and the spring surrounds the bearing bushings and lies within the space between and is protected by the cup and disk. The abutments 29—30 are preferably arranged for abutting engagement with each other at the point 40 to limit the relative rotation beween the cup and disk in one direction under the influence of the torsion spring 28. My present invention relates particularly to means for limiting relative rotation between the cup and disk in the opposite direction so as to avoid overstraining or breakage of the spring whether the latter be of the coil torsion type as shown or be of other form.

In the preferred form, I employ a link or limit stop member engageable by abutments on the two relatively movable or hinged parts so as to limit the swinging or rotatable movement between those parts. In the form illustrated, I provide a link member having abutment surfaces for engagement by the abutments 29—30 already employed as abutments for the springs. The link member may comprise a relatively flat disk or washer 50 which preferably loosely surrounds the bearing boss 19 in the cup. A part of this washer preferably lies between the upper and lower hooks on the torsion spring 28 so as to be properly positioned thereby as will be particularly clear from the drawing. The washer or link has spaced abutments 51—52 for engagement by the abutments 29—30 on the relatively rotatable parts. Thus, when the flight is swung relatively to the chain, the abutments 29—30 will engage the abutments 51—52 and thus stop rotation before the elastic limit of the spring is reached.

My improved link for limiting rotative movement preferably fits quite loosely so that it may be readily put in and removed. If for any reason it is desired to change the desirable limit of rotative movement of the flight, it is only necessary to separate the cup and disk and insert a link 50 having the abutments 51—52 spaced apart a different distance. The link is exceedingly simple and cheap to manufacture and will serve as an adequate check on rotative movement so as to avoid overstraining or breakage of springs.

While the invention has been described in considerable detail and a preferred form illustrated, it is to be understood that various changes may be made within the scope of the invention as defined in the appended claims.

I claim:

1. In a flight mounting, a pair of relatively rotatable members rotatably secured together, spring means for urging said relatively rotatable members in one direction relatively to each other, abutment means on each of said members, and a limit stop member independent of said abutments and having spaced abutments engageable by said first mentioned abutments for limiting relative movement of said relatively rotatable members in the opposite direction.

2. In a flight mounting, a pair of relatively rotatable members rotatably secured together, an abutment on each of said members, a torsion spring engageable with said abutments for rotatably urging said two members in one direction, and a limit stop member movable relatively to the abutments and having spaced abutments thereon engageable by said first mentioned abutments for limiting the rotative movement of said relatively rotatable members in the opposite direction.

3. In a flight mounting, a pair of relatively rotatable members rotatably secured together and defining an enclosed space between them, a torsion spring in said enclosed space, an abutment member on each of said relatively rotatable members and engageable by the ends of said torsion spring, said abutments being positioned to be engageable with each other for limiting relative rotation of said two members in one direction, and a limit stop member having spaced apart abutments engageable by said first mentioned abutments for limiting the rotation of said members relatively to each other in the opposite direction.

4. In a flight mounting, a pair of relatively rotatable members, pivot means for pivotally connecting said members for relative rotatable movement, torsion spring means arranged concentrically of said pivot means for urging said members relatively to each other in one direction, a limit stop member having spaced abutments thereon, said two relatively rotatable members having abutment means engageable with said spaced abutments for limiting relative rotatable movement of the members relatively to each other in the opposite direction.

5. In a flight mounting, a pair of relatively rotatable members defining an enclosed space between them, pivot means for securing said members together, a torsion spring in said enclosed space and surrounding said pivot means, an abutment member on each of said relatively rotatable members and engageable by the ends of said torsion spring, said abutments being interengageable with each other for limiting relative rotatable movement between said members in one direction, and a limit stop member mounted concentrically of said pivot means and having spaced apart abutment surfaces engageable by said abutments on said relatively rotatable members for limiting relative rotation between said relatively rotatable members in the opposite direction.

6. In a flight mounting, a conveyor, a disk carried thereby, a cup member interfitting with said disk to define an enclosed cup space, bearing means between said disk and cup member for rotatably supporting said disk and cup member relatively to each other, axially extending abutments carried by said disk and cup members, a torsion spring in said cup member, each end of said torsion spring being engageable with one of said abutments for urging the same into engagement with each other and limiting relative rotation of said cup and disk members in one direction, an annular disk-like member concentrically arranged in said cup member, said disk member having spaced apart abutment surfaces engageable by said axially extending abutments on said disk and cup member for limiting rotative movement of said disk and cup members relatively to each other in the opposite direction, and a conveyor flight carried with said cup member.

CARL C. OTTOSON.